US010792601B2

(12) United States Patent
Tabchouri

(10) Patent No.: US 10,792,601 B2
(45) Date of Patent: Oct. 6, 2020

(54) AIR FILTER DEVICE FOR HVAC AND/OR FURNACE SYSTEMS

(71) Applicant: George Tabchouri, Brossard (CA)

(72) Inventor: George Tabchouri, Brossard (CA)

( * ) Notice: Subject to any disclaimer, the term of this patent is extended or adjusted under 35 U.S.C. 154(b) by 0 days.

(21) Appl. No.: 16/181,444

(22) Filed: Nov. 6, 2018

(65) Prior Publication Data
US 2019/0299137 A1 Oct. 3, 2019

Related U.S. Application Data

(63) Continuation of application No. 29/622,213, filed on Apr. 17, 2018, now abandoned.

(30) Foreign Application Priority Data

Mar. 29, 2018 (CA) ..................................... 2999686
Aug. 17, 2018 (CA) ..................................... 3014978

(51) Int. Cl.
*B01D 46/00* (2006.01)
*B01D 46/10* (2006.01)
*B01D 46/02* (2006.01)

(52) U.S. Cl.
CPC ..... *B01D 46/0005* (2013.01); *B01D 46/0028* (2013.01); *B01D 46/02* (2013.01); *B01D 46/10* (2013.01); *B01D 2265/06* (2013.01); *B01D 2279/50* (2013.01)

(58) Field of Classification Search
CPC ............ B01D 46/0005; B01D 46/0006; B01D 46/0028; B01D 46/10; B01D 2265/06; B01D 2279/50; B01D 46/02; B01D 46/023
See application file for complete search history.

(56) References Cited

U.S. PATENT DOCUMENTS

| 3,830,045 A * | 8/1974 | Copenhefer ........... B01D 46/10 55/501 |
| 5,368,622 A * | 11/1994 | McMillon ............. B01D 46/10 55/497 |
| 5,476,526 A * | 12/1995 | Attermeyer ........ B01D 46/0002 55/496 |
| 6,793,703 B1 * | 9/2004 | Sledge ............... B01D 46/0002 55/495 |
| 2007/0084168 A1 * | 4/2007 | Ashwood ............... B01D 46/10 55/486 |
| 2010/0269467 A1 * | 10/2010 | Crabtree ............... B01D 46/10 55/499 |
| 2010/0269468 A1 * | 10/2010 | Crabtree ............... B01D 46/10 55/499 |
| 2012/0317944 A1 * | 12/2012 | Lise .................... B01D 46/0002 55/499 |
| 2016/0317963 A1 * | 11/2016 | Williams ............... B01D 46/10 |
| 2017/0312678 A1 * | 11/2017 | Elliott ............... B01D 46/0005 |

* cited by examiner

*Primary Examiner* — Robert Clemente
(74) *Attorney, Agent, or Firm* — PRAXIS

(57) ABSTRACT

An air filter device for HVAC and/or furnace systems comprising a filter body defining a peripheral edge. The filter body comprises a sleeve and an insert. The sleeve is defined by overlying sheets and comprises filtering material for filtering air. The insert is positioned between the overlying sheet for providing an internal support to the sleeve. The filter body may be positioned within an outer frame comprising a peripheral edge and defining open front and rear faces for exposing the filtering material.

6 Claims, 5 Drawing Sheets

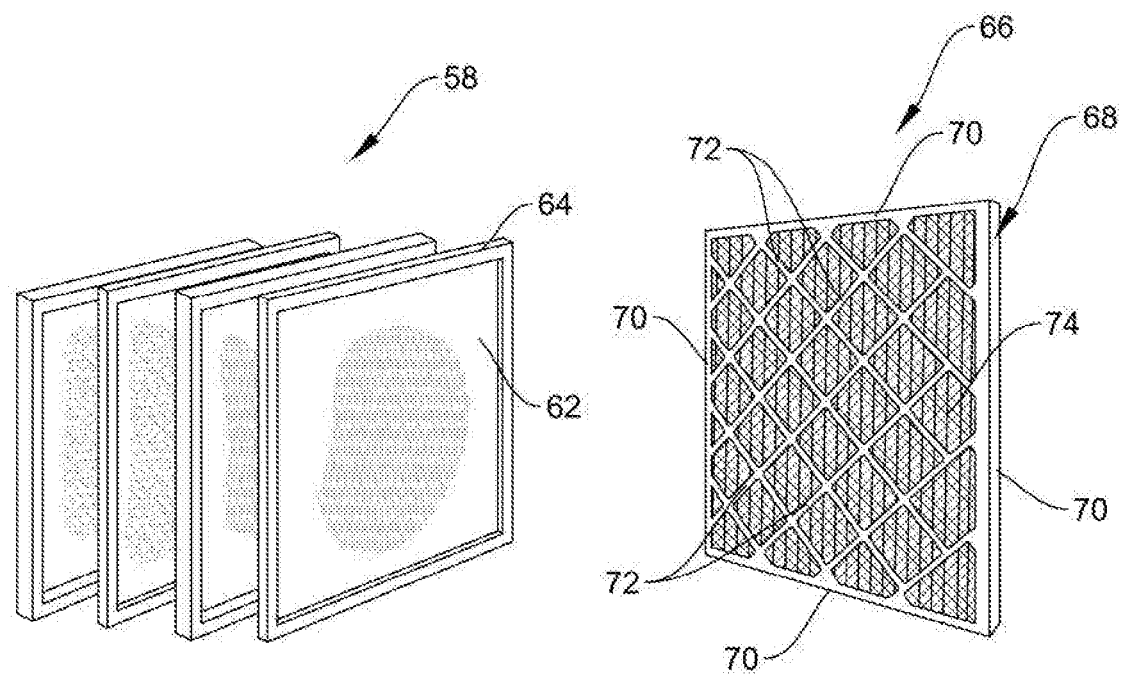
FIG. 4 (PRIOR ART)
FIG. 5 (PRIOR ART)
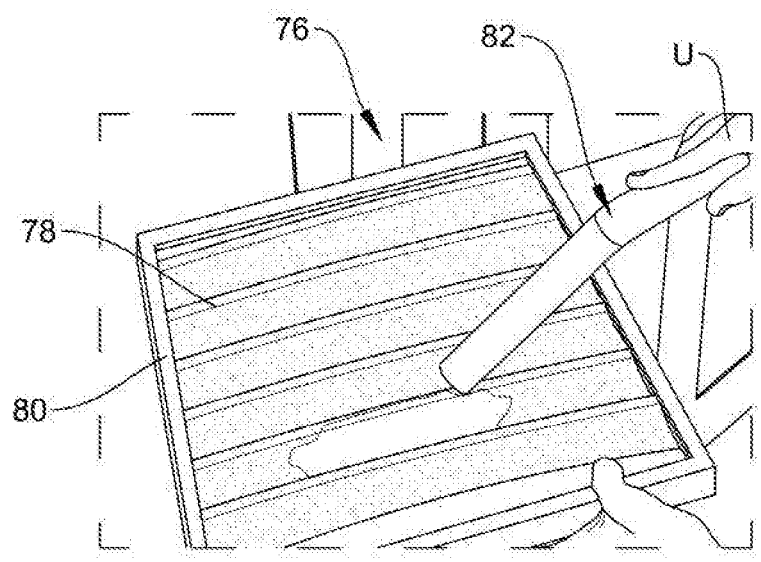
FIG. 6 (PRIOR ART)

AIR FILTER DEVICE FOR HVAC AND/OR FURNACE SYSTEMS

CROSS-REFERENCE TO RELATED APPLICATIONS

The present application claims priority on U.S. Design patent application Ser. No. 29/622,213 filed on Apr. 17, 2018, on Canadian Patent Application Number 2,999,686 filed on Mar. 29, 2018, and on Canadian Patent Application Number 3,014,978 filed on Aug. 17, 2018, all of which are incorporated herein by reference in their entirety.

TECHNICAL FIELD

The present disclosure generally relates to HVAC systems and furnaces. More specifically, but not exclusively the present disclosure relates to an air filter device for HVAC and/or furnace systems.

BACKGROUND

HVAC refers to heating, ventilation, and air conditioning. Its goal is to provide thermal comfort and acceptable indoor air quality. HVAC is an important part of residential structures, office buildings and the like, where safe and healthy building conditions are regulated with respect to temperature and humidity, using fresh air from outdoors. Furnaces include forced-air gas heating systems which are used in central air heating/cooling systems for houses in combination with air conditioners. Such systems require the use of filters to prevent dust accumulated therein from being recycled into the building structures, exposing people to large amounts of dust, pollution and microbes. FIGS. 4, 5 and 6 show prior art air filter devices. A particulate air filter is a device composed of fibrous or porous materials which removes solid particulates such as dust, pollen, mold, and bacteria from the air. Dust and impurities accumulate on the filters and prevent the HVAC and furnace systems from properly functioning. Accordingly, the filters need cleaning. Cleaning the filters is relatively burdensome and time consuming. FIG. 6 shows a user manually vacuuming the dust off an air filter device of the prior art. Consequently, home owners cut corners when cleaning their HVAC and/furnace filters due to the difficulties involved and as such, the filters are never fully cleaned.

OBJECTS

An object of the present disclosure is to provide an air filter device for HVAC and/or furnace systems.

An object of the present disclosure is to a provide a kit for air filtering of HVAC and/or furnace systems.

SUMMARY

In accordance with an aspect of the present disclosure, there is provided an air filter device for HVAC and/or furnace systems, the device comprising: a filter body defining a peripheral edge and comprising: a sleeve defined by overlying sheets and comprising filtering material for filtering air; and an insert positioned between the overlying sheet for providing an internal support to the sleeve.

In accordance with an aspect of the present disclosure, there is provided a kit for air filtering HVAC and/or furnace systems, the kit comprising: a sleeve defined by overlying sheets and comprising filtering material for filtering air; and an insert In an accordance with an aspect of the present disclosure, the air filter device and/or the kit further comprises an outer frame defining a peripheral edge and open front and rear faces, the peripheral edge of the outer frame defining an inner side thereof for receiving the peripheral edge of filter body, wherein the filter body is positioned or positionable within the outer frame, the open and rear faces exposing the filtering material. In an embodiment, the peripheral edge of the outer edge defines an open portion thereof for selectively removing the filter body from the outer frame. In an embodiment, the frame comprises mesh panels along at least one of the front and rear open faces.

In an embodiment, the insert is selectively removable from the sleeve.

In an embodiment, the peripheral edge defines an open portion thereof for providing access between the overlying sheets, the insert is selectively movable into and out of the sleeve via the open portion.

In an embodiment, the overlying sheets are connected together at the peripheral edge. In an embodiment, the connected overlying sheets are selectively unconnected along at least a portion of the peripheral edge.

In an embodiment, the filtering material comprises an antibacterial product and/or antibacterial product is added thereto.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 4 is a perspective view of prior art air filter devices;

FIG. 5 is a perspective view of another prior art air filter device;

FIG. 6 is a perspective view of yet another prior art air filter device during a cleaning procedure;

DETAILED DESCRIPTION OF ILLUSTRATIVE EMBODIMENTS

Generally stated and in accordance with an aspect of the present disclosure, there is provided d an air filter device for HVAC and/or furnace systems, the device comprising a filter body defining a peripheral edge. The filter body comprises a sleeve and an insert. The sleeve is defined by overlying sheets and comprises filtering material for filtering air. The insert is positioned between the overlying sheet for providing an internal support to the sleeve. In an embodiment, the device further comprises an outer frame defining a peripheral edge and open front and rear faces. The peripheral edge of the outer frame defines an inner side for receiving the peripheral edge of the filter body. The filter body is positioned within the outer frame and the open and rear faces expose the filtering material.

Figure 1:
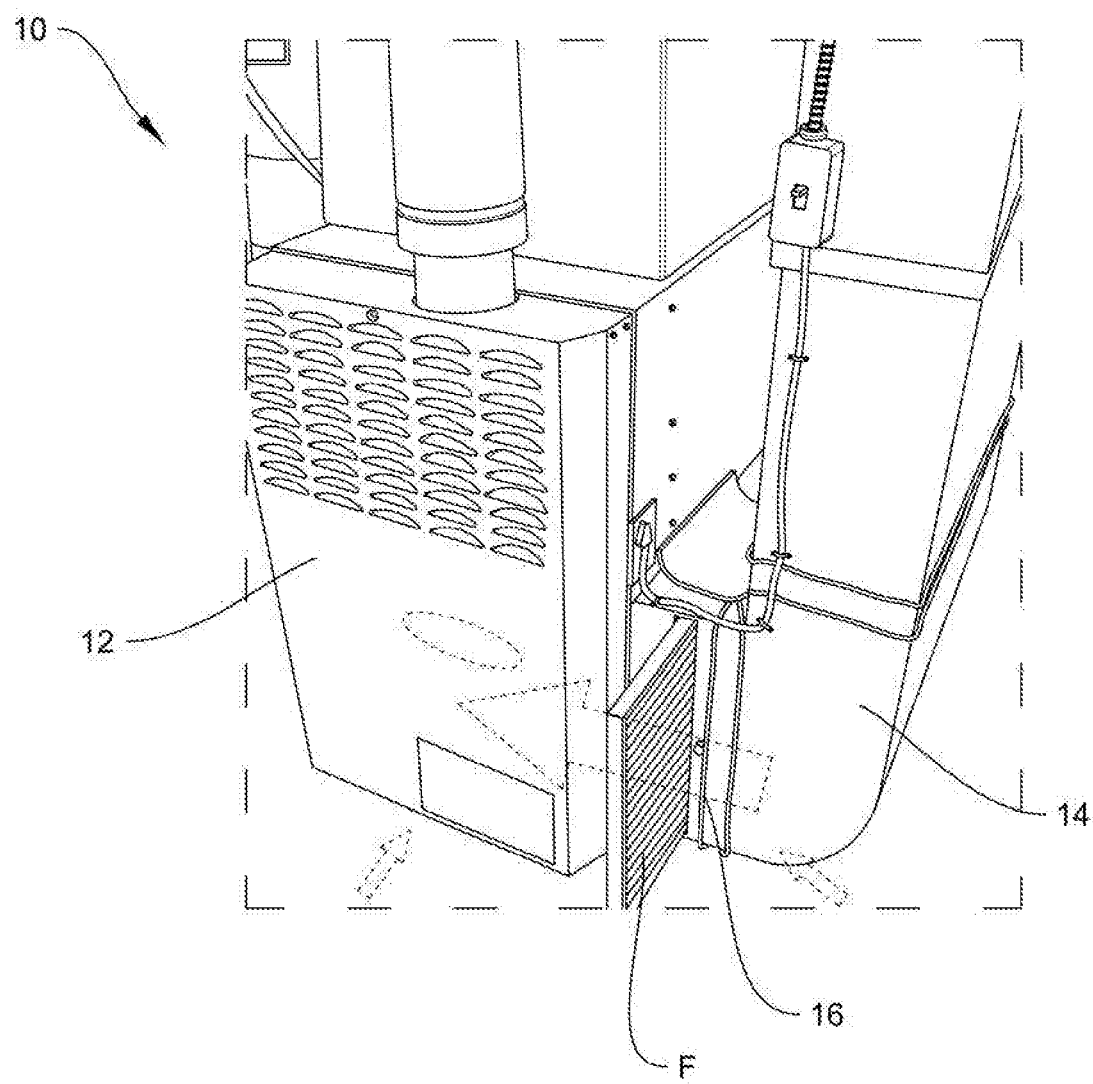
FIG. 1 is a perspective view of an HVAC duct system used with the filter device in accordance with a non-restrictive illustrative embodiment the present disclosure.

FIG. 1 is an example of an HVAC system 10 showing an air handler unit 12 in fluid communication with an air intake duct 14, the arrow 16 represents the direction of air flow. As shown, an air filter, generally denoted F, is positioned in the direction of air flow between the duct 14 and the air handler unit 12. The air filter F can be a filter of the prior art or a filter in accordance with the present disclosure as provided herein.

Figure 2:
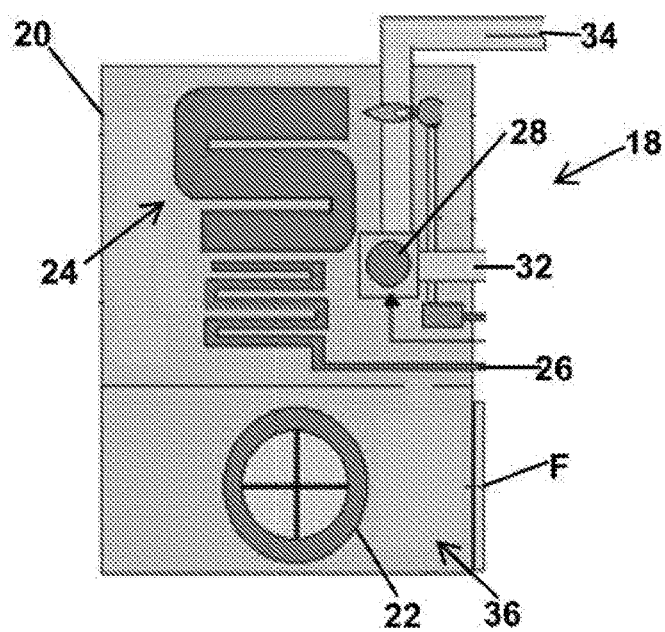
FIG. 2 is a side sectional view of a forced-air gas furnace system used with the filter device in accordance with a non-restrictive illustrative embodiment the present disclosure.

FIG. 2 shows an example of a forced air gas furnace system 18 includes a housing 20 for housing an air blower 22, the heat exchanger assembly 24, a condensation drain 26, a gas line 28, an inducer fan 30, a combustion air intake 32 and an exhaust pipe 34. A filter F is positioned at the return air side 36.

Figure 3:
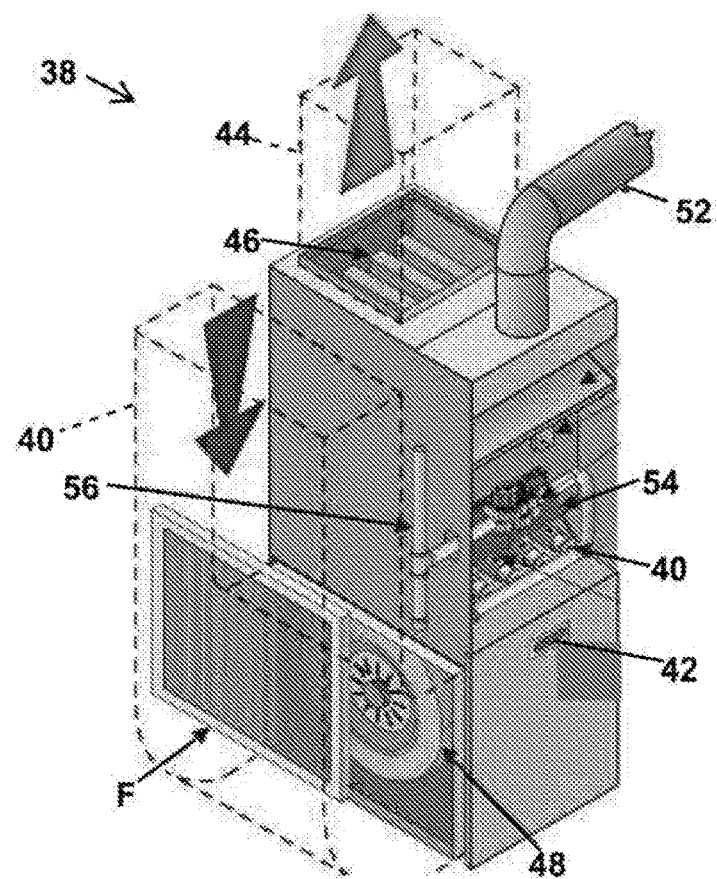
FIG. 3 is a perspective view of a forced-air gas furnace system used with the filter device in accordance with a non-restrictive illustrative embodiment the present disclosure.

FIG. 3 shows an example of a forced air gas furnace 38 including a housing 40 defining the air combustion intake 42, the warm air supply duct 44 which includes the heat exchanger 46 above a burner, the circulating fan 48 and the cold air return duct 50 including the filter F. The housing 40 includes vent 52 extending therefrom which is connected to the chimney and houses a gas valve and fan assembly 54 in fluid communication with a gas pipe 56.

The air filters F can be conveniently positioned in a variety of air ducts for HVAC and/or furnace systems as will be appreciated by the skilled artisan.

Turning now to FIGS. 4, 5 and 6, a variety of prior art air filters will be briefly discussed.

FIG. 4 shows the prior art air filters 58 comprising a flat surface fibrous filter material 62 in a generally rectangular configuration having each lateral edge thereof mounted to the inner edge of an outer frame 64. FIG. 5 shows a prior art air filter 66 having an outer frame 68 defining lateral edge sections 70 and front and rear face mesh panels 72 for housing therebetween a ridged surface fibrous filter material 74. FIG. 6 shows a prior art air filter 76 having a ridged surface filter material 78 mounted at each lateral edge thereof to the inner sides of a rectangular panel 80. As is shown, the user U cleans the material 78 with a vacuum 82.

Turning now to FIGS. 7, 8, 9, and 10 a non-restrictive illustrative embodiment of the air filter device of the present disclosure will now be described. The air filter devices of the present disclosure provide for filtering air in HVAC and/or furnaces such as for example systems 10, 18 and 38 and other like systems as is understood by the skilled artisan. Accordingly, the air filters of the present disclosures can be used in lieu of prior art filters such as for example, filters 58, 66, 76 and other like filters as is understood by the skilled artisan.

Figure 7:
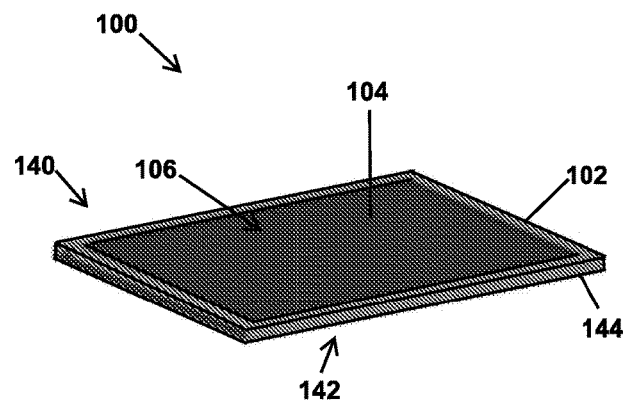
FIG. 7 is a perspective view of the air filter device in accordance with a non-restrictive illustrative embodiment the present disclosure.
Figure 8:
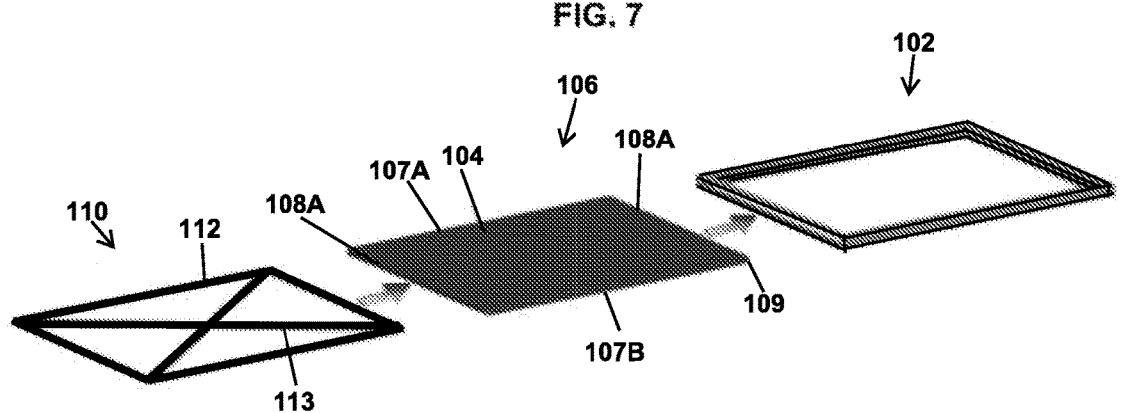
FIG. 8 is an exploded perspective view of the air filter device of FIG. 7.

With particular reference to FIGS. 7 and 8, there is shown an air filter device 100 for HVAC and/or furnace systems in accordance with a non-restrictive illustrative embodiment of the present disclosure.

The device 100 includes an outer frame 102 delimiting a filter material 104. The filter material 104 is provided in the form of a sleeve 106. In an embodiment, sleeve 106 comprises the filter material 104 on a suitable portion thereof.

The sleeve 106 is shown having a rectangular configuration defining a pair of opposite sides 107A and 107b and a pair of opposite sides 108A and 108B. The sides 107A, 107B, 108A and 108B define the peripheral edge 109 of the sleeve 106 and a portion thereof is open for receiving an insert. In this example, at least one of the sides 107A, 107b, 108A and 108b is open for receiving an insert 110.

Figure 9:
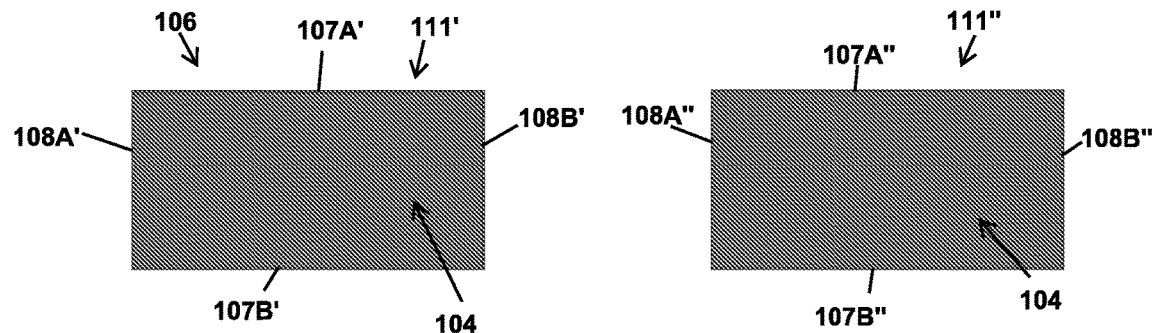
FIG. 9 is an exploded view of the overlying sheets of the sleeve of the device of FIG. 7.

As such, the sleeve 106 comprises a pair of overlying sheets 111' and 111" as shown in FIG. 9. The sheets 111' and 111' are made of the fibrous filter material 104 or comprise the fibrous filter material 104 on a portion thereof. Sheet 111' includes a pair of opposite sides 107A' and 107B' and a respective pair of opposite sides 108A' and 108B'. Sheet 111" includes a pair of opposite sides 107A" and 107B" and a respective pair of opposite sides 108A" and 108B". When the sheets 111' are overlapped the sides 107A' and 107A" form side 107A of the sleeve 106, the sides 107B' and 107B" form side 107B of the sleeve 106, the sides 108A' and 108A" form side 108A of the sleeve 106, the sides 108B' and 108B" form side 108B of the sleeve 106.

The mating side pairs (107A' and 107A"; 107B' and 107B"; 108A' and 108A"; 108B' and 108B") of the overlapping sheets 111' and 111' may be interconnected by sewing, sealing, adhesives, fasteners, zippers, connectors, hook and loop fasteners, buttons and other elements for either permanent connection or openable connection. As such, one of the mating sides pairs (107A' and 107A"; 107B' and 107B"; 108A' and 108A"; 108B' and 108B") are left fully or partially unconnected either by not being sewn, fastened, connected, sealed, adhered or by being selectively opened by releasing the hook and loop fasteners, by unzipping, by unbuttoning and the like. In this way, the sleeve 106 provides for a portion of its peripheral edge is permanently or selectively open for receiving the insert 110 between the sheets 111' and 111".

In the example herein, the insert 110 includes an outer frame 112 and inner stabilizers 113 spanning the width of the frame for providing rigidity thereto. In an example, the frame including its stabilizers can be provided in an assembly of parts for being assembled together by the user with the aid of an instructions manual. In this example, the insert 110 defines a generally rectangular configuration. The sleeve 106 receives the insert 110 therein via the open side thereof, (which is side 108A in this non-limiting example). The insert 110 acts as a support or skeleton to the filter body 114 (i.e. sleeve 106 with insert 110 therein).

Figure 12:
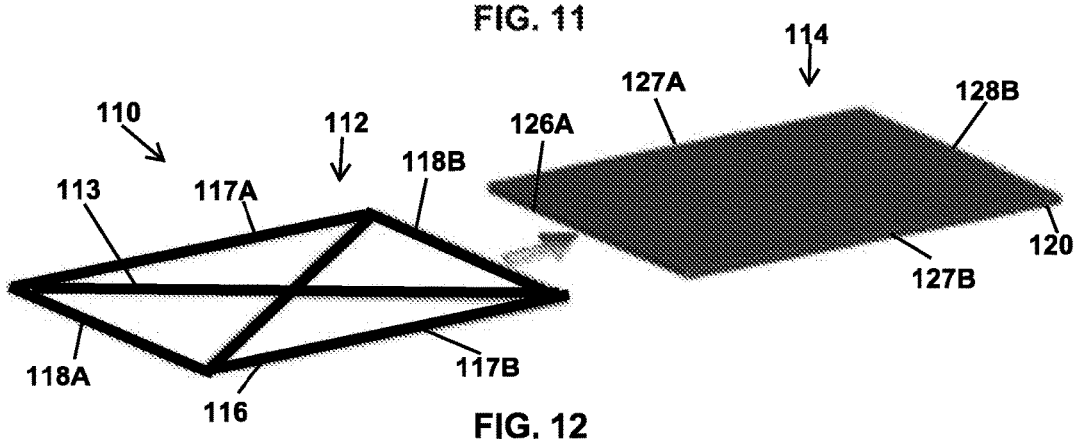
FIG. 12 is perspective view of the filter body of the device of FIG. 7 exploded and assembled views as well as exploded and assembled perspective views of an air filter device in accordance with a further non-restrictive illustrative embodiment of the present disclosure.

Turning to FIG. 12, the frame 112 includes a peripheral edge 116 defining a pair of opposite sides 117A and 117B and a pair of opposite side 118A and 118b. Side 117A mates with the inner edge of side 107A of the sleeve 106 to define side 127A of the filter body 114. Side 117B mates with the inner edge of side 107B of the sleeve 106 to define side 127B of filter body 114. Side 118A mates with the inner edge of side 108A of the sleeve 106 to define side 128A of the filter body 114. Side 1186 mates with the inner edge of side 1086 of the sleeve 106 to define side 128B of the filter body 114.

The filter body 114 defines a peripheral edge 120 which includes the sides 127A, 127B, 128A and 128B.

Figure 10:
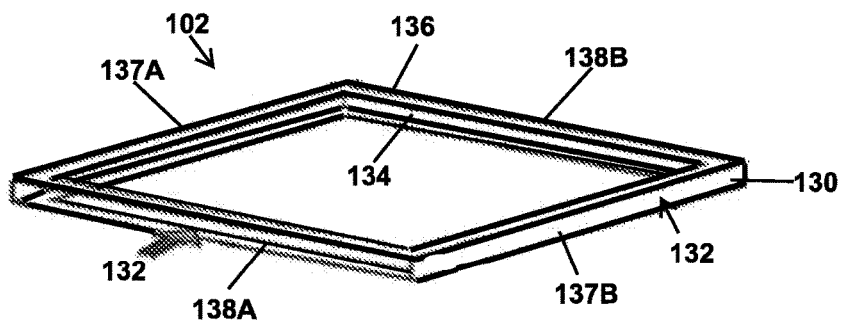
FIG. 10 is a perspective view of the outer frame of the device of FIG. 7.

Turning now to FIG. 10, the outer frame 102 includes a peripheral edge 130 including an open portion 131 thereof for receiving the filter body 114 and a closed portion 132. The closed portion 132 defines an inner edge 133 including a slot 134 defined by a pair of spaced apart rails 136 the peripheral edge of the filter body 114 therein. The peripheral edge 131 defines a pair of opposite sides 137A and 1376 and a pair of opposite side 138A and 1386. At least one the sides 137A, 1376, 138A and 1386 includes the open potion 131. In this example side 138A is open. When the filter body 114 is inserted into the outer frame 102 side 127A mates with side 137A, side 127B mates with side 137B, side 128A mates with side 138A and side 128B mates with side 138B.

The skilled artisan will appreciate that the frame 102 can be provided in an assembly of parts for being assembled together by the user with the aid of an instructions manual. The open side 138A can be closed by a closure element. Moreover, more than one or even all the sides 137A, 137B, 138A and 138B may include closure members for selectively opening and closing a given side for selectively receiving the filter body 114.

With reference to FIG. 7, when assembled the device 100 includes defines front and rear open front and rear faces 140 and 142 defined by the frame 102 for exposing the filter material 104 and a peripheral edge 144 defined by the frame 102 for delimiting the filtering material 104.

Figure 11:
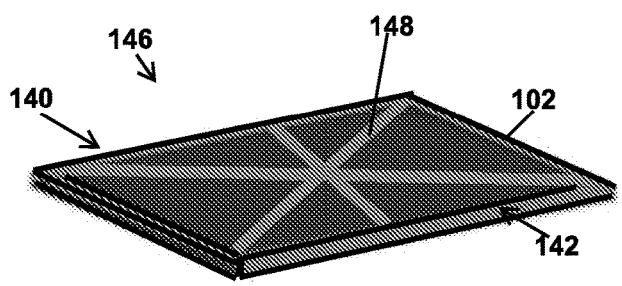
FIG. 11 is perspective view of an air filter device in accordance with another non-restrictive illustrative embodiment of the present disclosure.

FIG. 11 shows an air filter device 146 for HVAC and/or furnace systems in accordance with a non-restrictive illustrative embodiment of the present disclosure. Device 146 is similar to device 100 with the exception that outer frame 102 includes a mesh panel 148 on the front and rear faces 140 and 142 of the device 100.

With reference to FIG. 12, there is shown an air filter device 150 for HVAC and/or furnace systems in accordance with a non-restrictive illustrative embodiment of the present disclosure. Device 150 is similar to device 100 with the exception that it does not include the outer frame 102. As such, air filter 150 comprises the filter body 114 of device 100 namely the sleeve 106 and the insert 110.

Devices 100, 146 and 150 described herein have shown air filters having a generally rectangular configurations, yet the skilled artisan will appreciate that the devices herein can be provided in other configurations within the scope of the disclosure.

Figure 13:
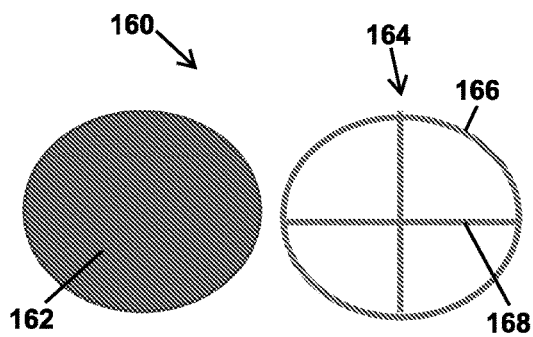
FIG. 13 is a front disassembled view of a an air filter device in accordance with yet another non-restrictive illustrative embodiment of the present disclosure.

FIG. 13 shows an example of a filter device 160 for HVAC and/or furnace systems in accordance with a non-restrictive illustrative embodiment of the present disclosure. Device 160 includes a sleeve 162 having a generally circular configuration. The sleeve 162 comprises the fibrous filter material and defines an open portion thereof for receiving a circular insert 164 having a circular frame 166 with stabilizer members 168 spanning the width thereof.

Figure 14:
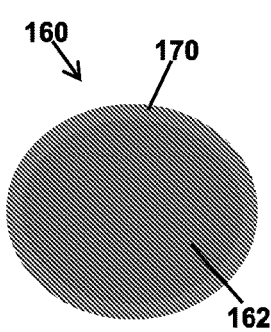
FIG. 14 is a front view of an air filter device in accordance with yet a further non-restrictive illustrative embodiment of the present disclosure.

As shown in FIG. 14 and in accordance with another illustrative embodiment, the device 160 may also include a circular outer frame 170 for receiving the sleeve 162 with insert 164 therein.

Figure 15:
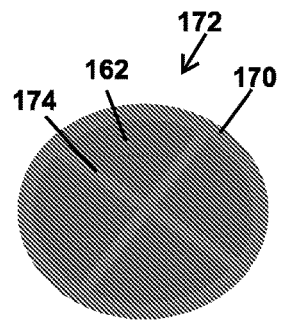
FIG. 15 is a front view of an air filter device in accordance with still yet another non-restrictive illustrative embodiment of the present disclosure.

FIG. 15 shows an air filter device 172 in accordance with a further embodiment of the present disclosure. Device 172 is similar to device 160 of FIG. 14 with the exception that the outer frame 170 includes a mesh panel 174.

In order to clean the devices herein, the user removes the device from the HVAC and/or furnace system. The user then removes the filter body from the outer frame and then removes the insert from the sleeve in order to wash the sleeve. If the device does not include an outer frame, the user only needs to remove the insert from the sleeve to disassemble the device. The sleeves of the devices herein are washable by hand or by washing machine. Once washed and dried, the sleeve is reassembled with the insert (and optionally with the outer frame) to be placed back in use.

Thus, the devices herein are easy to install, remove, wash and reuse. Accordingly, and in an embodiment, the devices herein are eco-friendlier as one air filter herein can replace more than 100 disposable filters. Disposable filters are replaced every two-months on average. In addition to their environmental benefits, the present devices also provide cost savings to consumers due to the fact that the filter device can be reused. Moreover, only the sleeve needs to be disposed after damage as the insert and outer frame can continued to be used. In air filters it is usually the fibrous filter material that is damaged and not the support frame structure. Hence, the present air filters are still more environmentally friendly and less costly as only on element needs to be disposed of and replaced due to usual wear and tear and that over a long period of time (e.g. 10-20 years).

In an embodiment, the filter material of the devices herein comprises microfiber material. In an embodiment, the filter material comprises antibacterial products. In an embodiment, the user can treat the filter material after each wash with antibacterial products such as sprays.

In an embodiment, the insert and/or outer frames of the devices herein comprise rigid and strong material such as steel.

In an embodiment, the filter material herein can be washed about 50 times before requiring replacement.

The insert also helps keep the filter material straight and avoids stretching further increasing the life span of the devices herein.

In an embodiment, the devices herein provide for high performance air filters where 15% of air flow is lost.

The various components, parts, elements, configurations, structures, functions and characteristics including alternatives of the devices 100, 146, 150, 160 and 172 described herein can be combined in various ways.

The devices herein can be provided in kits of assemblies including instruction manuals.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. An air filter device for HVAC and/or furnace systems, the device comprising:
   a rectangular sleeve defined by overlying flat sheets comprising filtering material for filtering air, the filtering material comprising reusable and machine washable microfiber material, the sleeve defining an outer surface thereof and an inner surface thereof between the overlying sheets and defining an inner open area, the outer surface defining a pair of opposite faces, outer peripheral edges between the opposite faces and outer corners between the outer peripheral edges, at least one outer peripheral edge being open and leading to the inner open area, the inner surface defining inner peripheral edges between the overlying sheets and inner corners between the inner peripheral edges; and
   a rectangular insert for being removably inserted into the rectangular sleeve via the open outer peripheral edge, the rectangular insert comprising an outer rectangular frame defining peripheral edges and corners therebetween,
   wherein when the rectangular insert is inserted within the sleeve, the peripheral edges and corners of the rectangular frame engage the inner peripheral edges and inner corners of the sleeve thereby providing support to the sleeve.

2. An air filter device according to claim 1, wherein the frame comprises mesh panels.

3. An air filter device according to claim 1, wherein the filtering material comprises an antibacterial product.

4. A device according to claim 1, wherein the open peripheral edge is selectively closable.

5. A device according to claim 1, wherein the frame comprises stabilizers spanning a width thereof.

6. A device according to claim 1, wherein the frame comprises an assembly of parts of being assembled.

* * * * *